United States Patent
Chen et al.

(10) Patent No.: US 8,793,296 B2
(45) Date of Patent: Jul. 29, 2014

(54) RANDOM NUMBER GENERATING METHOD

(75) Inventors: I-Te Chen, Kaohsiung (TW); Jer-Min Tsai, Kaohsiung (TW); Jeng-Nan Tzeng, Kaohsiung (TW); Wen-Hsien Ho, Kaohsiung (TW)

(73) Assignee: Kaohsiung Medical University, Kaohsiung (TW)

( * ) Notice: Subject to any disclaimer, the term of this patent is extended or adjusted under 35 U.S.C. 154(b) by 391 days.

(21) Appl. No.: 13/364,797

(22) Filed: Feb. 2, 2012

(65) Prior Publication Data
US 2013/0204915 A1    Aug. 8, 2013

(51) Int. Cl.
*G06F 7/58* (2006.01)

(52) U.S. Cl.
USPC ........................................... 708/254

(58) Field of Classification Search
CPC ......... G06F 7/582; G06F 7/588; G06F 7/584; H04L 9/22; H04B 1/7143
USPC ........................................... 708/254
See application file for complete search history.

(56) References Cited

U.S. PATENT DOCUMENTS

| 2009/0177725 A1 | 7/2009 | Ikegami et al. |
| 2010/0106756 A1* | 4/2010 | Ellison ........................ 708/254 |
| 2010/0115231 A1 | 5/2010 | Yui |
| 2014/0040338 A1* | 2/2014 | Van Der Sluis et al. ...... 708/254 |

OTHER PUBLICATIONS

Chen, et al., "Audio Random Number Generator and its Application", IEEE-Int. Conf. Mach. Learn. and Cyber., Guilin, (Jul. 10-13, 2011), pp. 1678-1683.

* cited by examiner

*Primary Examiner* — Tan V. Mai
(74) *Attorney, Agent, or Firm* — Muncy, Geissler, Olds & Lowe, P.C.

(57) ABSTRACT

A random number generating method includes sending a signal source for outputting a data sequence and randomly retrieving a segment of data having an operation length as a seed; converting the seed into a first operation value, determining whether a difference between the first operation value and a second operation value is larger than a threshold value, and determining whether a total number of times the first operation value has been inputted into the operation value processing step is larger than a predetermined value. The first operation value is reset by a reset algorithm; otherwise the sample selection step is re-performed. The operation values are converted into a random number. A total number of bits of the random number is calculated. The operation value setting step is performed or a latest random number having a length equal to the operation length is set as the seed.

9 Claims, 3 Drawing Sheets

RANDOM NUMBER GENERATING METHOD

BACKGROUND OF THE INVENTION

1. Field of the Invention

The present invention generally relates to a random number generating method and, more particularly, to a random number generating method that can determine the level of randomness of input values thereof.

2. Description of the Related Art

Random number has been widely adopted in a variety of fields such as cryptography, game theory, quantum machine, statistics, etc. When random number is applied to an encrypt-decrypt system or game system having random processes, the safety of the encrypt-decrypt system and the randomness of the game system can be improved if the random numbers are generated in a high level of randomness with extremely low predictability.

Conventional random number generators include True Random Number Generator (TRNG) and Pseudo Random Number Generator (PRNG). TRNG uses random events as input signals to generate a true random number. Such random events may be randomly-generated noises or signals. PRNG uses software or mathematic algorithms to randomly generate a virtual random number. However, the virtual random number is obtained through mathematic algorithms in essential and is therefore expectable. As a result, when the random number generator is applied to a protection system associated with the encrypt-decrypt system, the safety of the protection system cannot be assured if the sequence in generating the virtual random numbers is cracked.

Although TRNG is capable of generating a true random number with higher unpredictability, the final output of TRNG also has a greater similarity if the random event has a certain rule of randomness within a predetermined period of time, making it difficult to ensure a greater difference between two continuously-generated numbers. Therefore, the falling points of the generated random numbers are too close. In light of this problem, it is desired to provide a random number generating method with better performance.

SUMMARY OF THE INVENTION

It is therefore the primary objective of this invention to provide a random number generating method which generates random numbers in high unpredictability.

It is another objective of this invention to provide a random number generating method which generates random numbers with better random distribution.

The invention discloses a random number generating method comprising a sample selection step, an operation value setting step, a randomness level determination step, an operation value processing step, a random number generation step and a random number processing step. The sample selection step sends a signal source received by a sampling device to a transcoder for outputting a data sequence, and randomly retrieves a segment of data having an operation length from the data sequence via an operation unit, wherein the randomly-retrieved data segment is used as a seed. The operation value setting step converts the seed into a first one of a plurality of operation values via a setup algorithm contained in the operation unit, wherein the plurality of operation values other than the first operation value is initially set as 0. The randomness level determination step determines whether a difference between the first one and a second one of the plurality of operation values is larger than a threshold value via the operation unit. Upon negative determination of the randomness level determination step, the operation value processing step determines whether a total number of times the first operation value has been inputted into the operation value processing step for executions is larger than a predetermined value. The first operation value is reset by a reset algorithm contained in the operation unit and the operation value processing step is re-performed if the determination of the operation value processing step is negative, and the sample selection step is re-performed if the determination of the operation value processing step is positive. Upon positive determination of the randomness level determination step, the random number generation step converts the plurality of operation values into a random number via a random number algorithm contained in the operation unit. The random number processing step calculates a total number of bits of the random number via the operation unit. The operation value setting step is performed if the total number of bits of the random number is not a multiple of the operation length of the seed, and a latest random number having a length equal to the operation length is set as the seed and the operation value setting step is re-performed if the total number of bits of the random number is the multiple of the operation length of the seed.

In a preferred form shown, the plurality of operation values comprises the first operation value, the second operation value and a third operation value. The second and third operation values are initially set as 0.

In a preferred form shown, the setup algorithm is $Ci=10+(RND_{byte}*(CPi<<2)+R)\%25$. $Ci$ is the first operation value, $CPi$ is the second operation value, $RND_{byte}$ is the seed, $i$ is the number of the retrieved data segments, $R$ is a total number of times the setup algorithm has been performed, $<<2$ represents 2 bits of leftward data shift, and $\%25$ represents a remainder obtained by dividing a result value of $10+(RND_{byte}*i+(CPi<<2)+R)$ by 25.

In a preferred form shown, the difference between the first and second operation values is calculated according to the following formula: $(Ci-CPi)^2$.

In a preferred form shown, the reset algorithm is: $Ci=10+(CPi+(Ci\char`\^W)+R)\%25$. $W$ represents the total number of times the first operation value has been inputted into the operation value processing step for executions, and the symbol $\char`\^$ represents an exponential operator.

In a preferred form shown, the random number algorithm is:

$$\text{bit}[i]=1\&(C_1\oplus C_2\oplus\ldots\oplus C_n\oplus CP_1\oplus CP_2\oplus\ldots\oplus CP_n\oplus CPP_1\oplus CPP_2\oplus\ldots\oplus CPP_n),$$

wherein & represents an AND operator, $\oplus$ represents an XOR operator, and bit[i] represents the random number.

In a preferred form shown, wherein the random number processing step comprises: a bit number determination step determining whether the total number of bits of the random number is the multiple of the operation length of the seed via the operation unit; a second operation value designation step designating the second operation value as the first operation value and performing the operation value setting step via the operation unit, upon negative determination of the bit number determination step; a third operation value designation step designating the third operation value as the first operation value upon positive determination of the bit number determination step; and a seed designation step setting the latest random number having a length equal to the operation length as the seed via the operation unit upon positive determination of the bit number determination step.

In a preferred form shown, the threshold value is set as half of a variance of the first 1K bytes of the data sequence.

In a preferred form shown, the predetermined value is 100.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
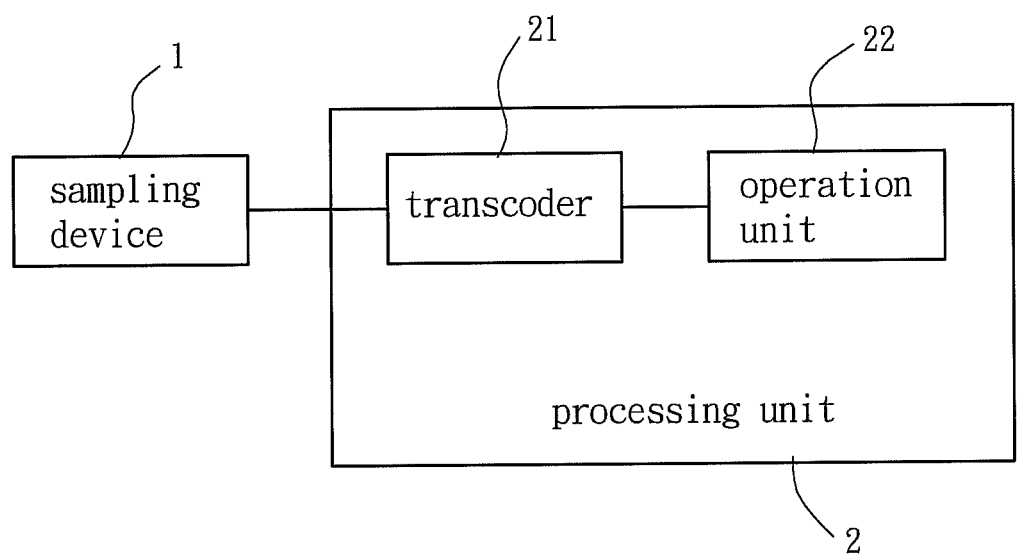
FIG. 1 shows a block diagram of a random number generating system according to a preferred embodiment of the invention.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

The term "carry configuration" referred hereinafter is a configuration that reflects the carry of a numerical or coding system, such as a binary, octal or decimal configuration.

The term "data sequence" referred hereinafter represents a plurality of continuous data codes consisting of a plurality of numbers or symbols, such as 1100, 01011110, etc.

The term "operation length" referred hereinafter represents the number of bits contained in a data sequence. For example, the operation length of the data sequence 1100 is 4.

The term "variance" referred hereinafter is represented as $$\sigma^2 = \frac{\Sigma(x_i - \mu)^2}{N},$$

wherein $x_i$ is data value, $\mu$ is an expected value of the data value, and N is the total number of data.

FIG. 1 shows a block diagram of a random number generating system comprising a sampling device 1 and a processing unit 2 connected to the sampling device 1. The sampling device 1 is used to receive and send a source signal to the processing unit 2 which, in turn, performs operations associated with random number generation based on the received source signal. The source signal may be a video signal, and the sampling device 1 may be a video camera receiving the video signal. Alternatively, the source signal may be an audio signal, and the sampling device 1 may be a microphone receiving the audio signal. However, the sampling device 1 and the source signal are not limited thereto.

The processing unit 2 comprises a transcoder 21 and an operation unit 22. The transcoder 21 converts the source signal from analog form to digital form and outputs a data sequence. In this embodiment, the data sequence is a binary code such as 0101110. The operation unit 22 may receive the data sequence from the transcoder 21 and perform retrieval or calculation on the data sequence to retrieve a data segment.

Figure 2:
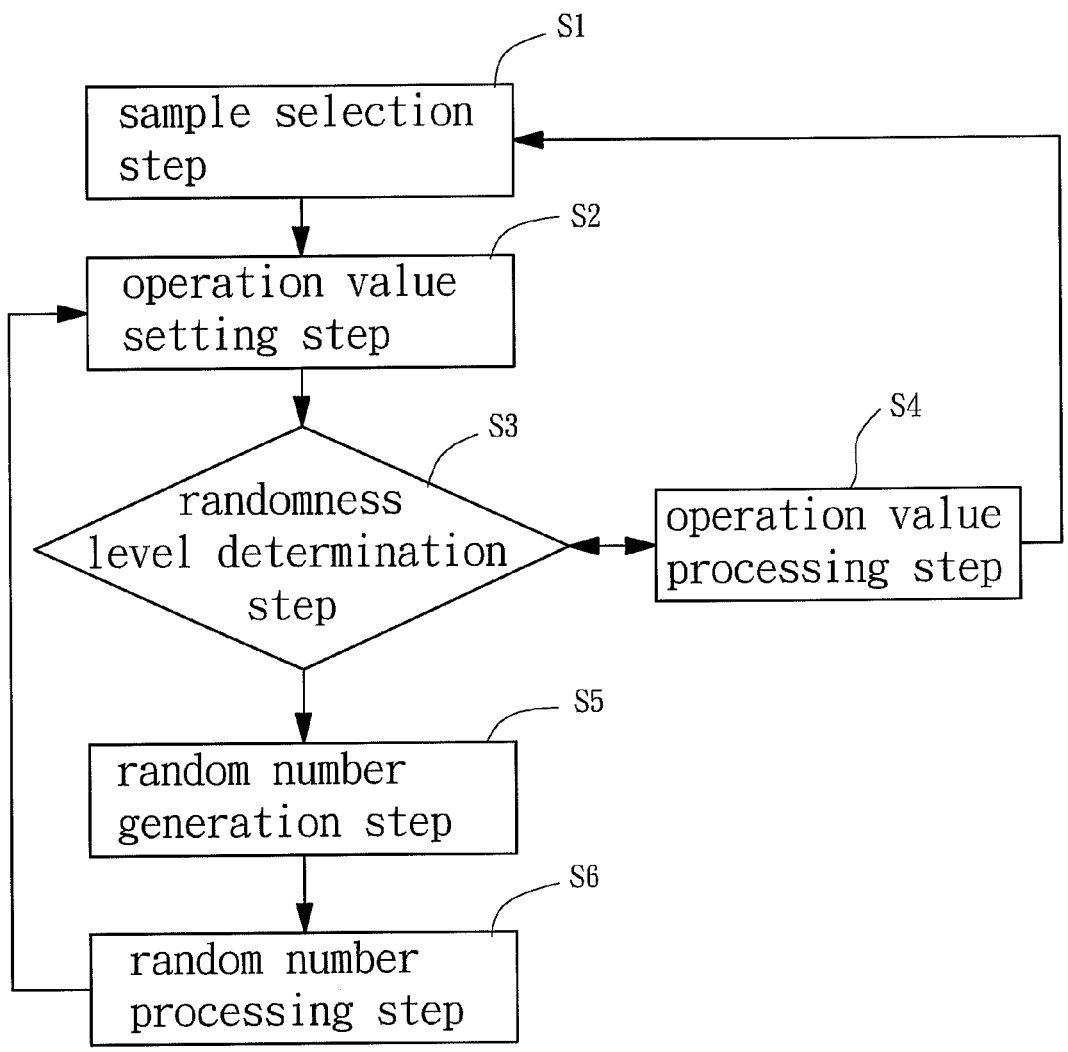
FIG. 2 shows a flowchart of a random number generating method according to the preferred embodiment of the invention.

The random number generating system may perform a random number generating method as shown in FIG. 2. The random number generating method comprises a sample selection step S1, an operation value setting step S2, a randomness level determination step S3, an operation value processing step S4, a random number generation step S5 and a random number processing step S6.

The sample selection step S1 is adapted to send a signal source received by the sampling device 1 to the transcoder 21 for outputting a data sequence, and to randomly retrieve a segment of data having the operation length from the data sequence. In other words, the randomly-retrieved data segment is used as a seed. The source signal received by the sampling device 1 may be converted into the digital form via the transcoder 21, and the digital signal is outputted as the data sequence. The operation unit 22 may randomly retrieve a segment of data having the operation length from the data sequence and uses the retrieved data segment as a seed for further operations. For example, assume the data sequence outputted by the transcoder 21 is 0011101000101 and the operation length is set as 8, the operation unit 22 retrieves a segment of data 00111010 or 01110100 from the data sequence 0011101000101 as a seed.

The operation value setting step S2 is adapted to convert the seed into an operation value via a setup algorithm contained in the operation unit 22. The operation value is an input value required for random number generation. The seed can be converted into the operation value via the setup algorithm embedded in the operation unit 22. The setup algorithm is, but not limited to, as follows:

$$Ci = 10 + (RND_{byte} * i + (CPi << 2) + R)\%25, \quad (1)$$

wherein Ci is a first operation value, CPi is a second operation value, and $RND_{byte}$ is the seed having a length of 8 equal to 1 byte. Also, i is the number of the retrieved data segment (s), R is the total number of times the setup algorithm has been performed, <<2 represents 2 bits of leftward data shift, and %25 represents a remainder obtained by dividing the preceding result value by 25.

Specifically, if the operation unit 22 randomly retrieves only one data segment from the outputted signal of the transcoder 21, i will be 1. At this point, only $C_1$ is calculated. If the operation unit 22 randomly retrieves two data segments from the outputted signal of the transcoder 21, i will be 2, which requires calculations of $C_1$ and $C_2$. To provide a better understanding of the invention, i is taken as 1 in the following example for illustration purpose.

In the embodiment, the first operation value $C_1$ and the second operation value $CP_I$ may be initially set as 0. Therefore, when the setup algorithm (1) is initially executed, the setup algorithm (1) only retrieves the seed $RND_{byte}$ from the data sequence outputted by the transcoder 21. The result value of the seed $RND_{byte}$ is specified as the first operation value $C_1$.

The randomness level determination step S3 determines whether a difference between the first operation value $C_1$ and the second operation value $CP_1$ is larger than a threshold value. If so, the random number generation step S5 is performed. If not, the operation value processing step S4 is performed. In this embodiment, the threshold value is set as half of the variance of the first 1K bytes (1000 bytes) of the data sequence. Since both the first operation value $C_1$ and the second operation value $CP_1$ are used as inputs for random number generation, the randomness level determination step S3 may keep the first operation value $C_1$ and the second operation value $CP_1$ from being too close to each other. Thus, when the difference between the first operation value $C_1$ and the second operation value $CP_1$ is larger, the generated random numbers also have better random distribution without falling within a small range. The difference between the first operation value $C_1$ and the second operation value $CP_1$ may be calculated in the following manner:

$$(Ci-CPi)^2$$

The above formula calculates the square of the difference between the first operation value $C_1$ and the second operation value $CP_1$. The obtained value from the formula is then compared with the threshold value.

Upon negative determination of the randomness level determination step S3, the operation value processing step S4 determines whether a total number of times (which is called "reset times" hereinafter) the first operation value $C_1$ has been inputted into the operation value processing step S4 for executions is larger than a predetermined value. If so, the sample selection step S1 is performed. If not, the first operation value $C_1$ is reset by a reset algorithm contained in the operation unit 22, and the randomness level determination step S3 is then performed again. Upon determination of the randomness level determination step S3, if the difference between the first operation value $C_1$ and the second operation value $CP_1$ is smaller than the threshold value, the first operation value $C_1$ has a larger similarity with the second operation value $CP_1$. In this situation, the first operation value $C_1$ must be reset by the reset algorithm of the operation unit 22. This ensures a larger difference between the first operation value $C_1$ and the second operation value $CP_1$. The reset algorithm may be represented, but not limited to, as follows:

$$Ci=10+(CPi+(Ci\char`\^W)+R)\%25, \quad (2)$$

wherein W represents the reset times and the symbol ^ represents an exponential operator.

Specifically, the operation unit 22 counts the number of reset times each time the first operation value $C_1$ is reset, and performs the randomness level determination step S3 thereafter. If the determination of the randomness level determination step S3 is still negative, the reset algorithm (2) resets the first operation value $C_1$ again and adds up the current number of reset times by 1. When the number of the reset times is larger than the predetermined value, it means that the first operation value $C_1$ and the second operation value $CP_1$ generated by the source signal have a larger similarity. Thus, it is required to re-perform the sample selection step S1 to obtain a new signal source. Based on the new signal source, a new data segment may be obtained in a random manner and used as a seed. Then, a new first operation value $C_1$ is obtained through the setup algorithm (1). The predetermined value may be determined as desired. In this embodiment, the predetermined value is set as 100. As such, the sample selection step S1 is re-performed once the number of the reset times is larger than 100.

Upon positive determination of the randomness level determination step S3, the random number generation step S5 uses a random number algorithm contained in the operation unit 22 to convert the obtained operation values into a random number. The random number algorithm may be represented, but not limited to, as follows:

$$bit[i]=1\&(C_1\oplus C_2\oplus\ldots\oplus C_n\oplus CP_1\oplus CP_2\oplus\ldots \\ \oplus CP_n\oplus CPP_1\oplus CPP_2\oplus\ldots\oplus CPP_n), \quad (3)$$

wherein & represents an AND operator, $\oplus$ represents an XOR operator, $CPP_n$ represents a third operation value, and bit[i] represents the generated random number which is 1 bit. Specifically, assume that the first operation value $C_1$ is calculated as 10101010 and both the second operation value $CP_1$ and the third operation value $CPP_1$ are initially set as zero when the random number algorithm (3) is first performed, the random number algorithm (3) may be expressed as 1&(10101010). The "1" may be expressed as 00000001 and therefore the last bit 0 will be outputted as the random number.

Figure 3:
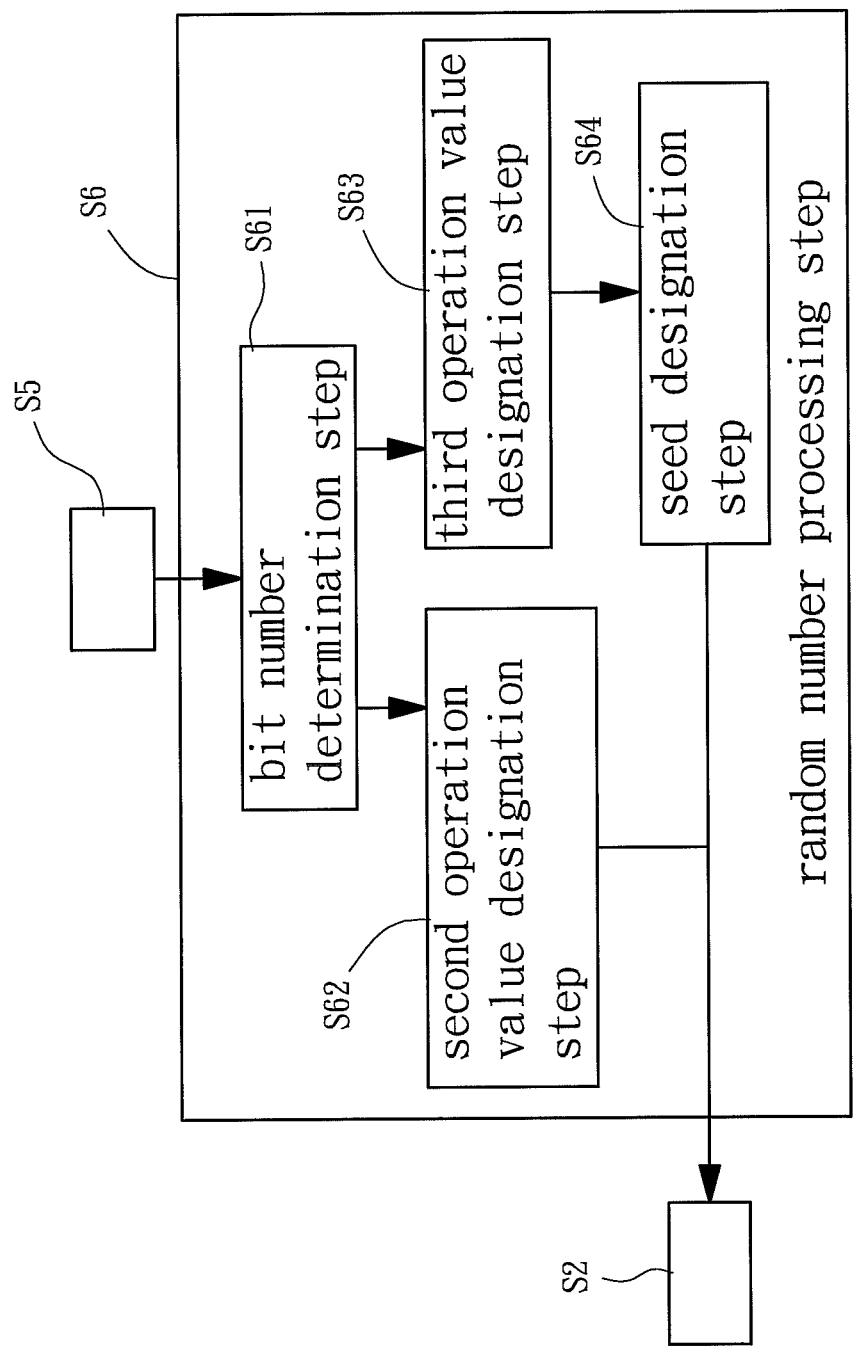
FIG. 3 shows a detailed flowchart of a random number processing step of the random number generating method.

The random number processing step S6 calculates the total number of bits of the random number with the operation unit 22. If the total number of bits of the random number is not a multiple of the operation length of the seed, the operation value setting step S2 is performed. If the total number of bits of the random number is a multiple of the operation length of the seed, the latest random number having a length equal to the operation length is set as the seed. Referring to FIG. 3, specifically, the random number processing step S6 comprises a bit number determination step S61, a second operation value designation step S62, a third operation value designation step S63 and a seed designation step S64.

The bit number determination step S61 determines whether the total number of bits of the random number is a multiple of the operation length of the seed. If not, the second operation value designation step S62 is performed. If so, the third operation value designation step S63 is performed. In this embodiment, since the operation length is 1 byte (which is 8 bits), the bit number determination step S61 determines whether the total number of bits of the random number is a multiple of 8.

Upon negative determination of the bit number determination step S61, the second operation value designation step S62 uses the operation unit 22 to designate the second operation value $CP_1$ as the first operation value $C_1$, and performs the operation value setting step S2 thereafter. Since 1 bit of random number is generated each time the random number generation step S5 is performed, the first random number generated by the random number generation step S5 has only one bit. At this point, the random number processing step S6 determines that the total number of bit of the random number is 1. Therefore, the random number processing step S6 designates the second operation value $CP_1$ as the first operation value $C_1$ and re-performs the operation value setting step S2, the randomness level determination step S3, the operation value processing step S4 and the random number generation step S5 to generate another random number with one more bit. The above steps are successively performed until a random number with a total number of bits being the multiple of 8 is generated. During the process, the second operation value $CP_1$ is designated as the first operation value $C_1$ and the procedure goes back to the operation value setting step S2 to calculate a new first operation value $C_1$ using the second operation value $CP_1$ (e.g. using the previous first operation value $C_1$). This allows different values to be generated in different times of random number generation, ensuring greater difference between the first operation value $C_1$ and the second operation value $CP_1$. Therefore, the generated adjacent random numbers can be kept from being too close to each other.

Upon positive determination of the bit number determination step S61, the third operation value designation step S63 uses the operation unit 22 to designate the third operation value $CPP_1$ as the first operation value $C_1$, and performs the seed designation step S64 thereafter. In this embodiment, the third operation value designation step S63 is performed when the total number of bits of the random number is a multiple of 8, designating the third operation value $CPP_1$ as the first operation value $C_1$.

Upon positive determination of the bit number determination step S61, the seed designation step S64 uses the operation unit 22 to set the latest random number having a length equal to the operation length as the seed. Specifically, when the random number generation step S5 is performed 8 times, an 8-bit random number is generated. Based on this, the determination of the bit number determination step S61 is positive, leading to performances of the third operation value designation step S63 and the seed designation step S64. This replaces the old seed with the latest random number having the operation length for further random number generation. When the old seed is replaced by the latest random number having the operation length, the third operation value $CPP_1$ also changes at the same time. This ensures that the random number generation step S5 is performed using different values, attaining higher unpredictability of the generated random numbers. Also, the operation value processing step S4 can ensure greater difference among the operation values during the process, keeping the adjacent random numbers from being too close to each other.

The random number generating method is terminated when the operation unit 22 detects a triggering condition. In such a case, the operation unit 22 may issue a termination signal to terminate the whole procedures. The timing for issuing the triggering condition is not limited. As an example, the termination signal can be issued when the generated random numbers reach a certain quantity or when the source signal has been used up. When the condition for issuing the termination signal is satisfied, the operation unit 22 may issue the termination signal to terminate the whole procedures.

The proposed random number generating method can replace the old seed with latest random number, thereby attaining high unpredictability of the generated random numbers.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A random number generating method comprising:
   a sample selection step sending a signal source received by a sampling device to a transcoder for outputting a data sequence, and randomly retrieving a segment of data having an operation length from the data sequence via an operation unit, wherein the randomly-retrieved data segment is used as a seed;
   an operation value setting step converting the seed into a first one of a plurality of operation values via a setup algorithm contained in the operation unit, wherein the plurality of operation values other than the first operation value is initially set as 0;
   a randomness level determination step determining whether a difference between the first one and a second one of the plurality of operation values is larger than a threshold value via the operation unit;
   an operation value processing step determining whether a total number of times the first operation value has been inputted into the operation value processing step for executions is larger than a predetermined value upon negative determination of the randomness level determination step, wherein the first operation value is reset by a reset algorithm contained in the operation unit and the operation value processing step is re-performed if the determination of the operation value processing step is negative, and the sample selection step is re-performed if the determination of the operation value processing step is positive;
   a random number generation step converting the plurality of operation values into a random number via a random number algorithm contained in the operation unit, upon positive determination of the randomness level determination step; and
   a random number processing step calculating a total number of bits of the random number via the operation unit, wherein the operation value setting step is performed if the total number of bits of the random number is not a multiple of the operation length of the seed, and a latest random number having a length equal to the operation length is set as the seed and the operation value setting step is re-performed if the total number of bits of the random number is the multiple of the operation length of the seed.

2. The random number generating method as claimed in claim 1, wherein the plurality of operation values comprises the first operation value, the second operation value and a third operation value, and the second and third operation values are initially set as 0.

3. The random number generating method as claimed in claim 2, wherein the setup algorithm is:

$$Ci=10+(RND_{byte}*i+(CPi<<2)+R)\%25,$$

wherein $Ci$ is the first operation value, $CPi$ is the second operation value, $RND_{byte}$ is the seed, $i$ is the number of the retrieved data segments, $R$ is a total number of times the setup algorithm has been performed, $<<2$ represents 2 bits of leftward data shift, and %25 represents a remainder obtained by dividing a result value of $10+(RND_{byte}*i+(CPi<<2)+R)$ by 25.

4. The random number generating method as claimed in claim 2, wherein the difference between the first and second operation values is calculated according to the following formula:

$$(Ci-CPi)^2.$$

5. The random number generating method as claimed in claim 2, wherein the reset algorithm is:

$$Ci=10+(CPi+(Ci\textasciicircum W)+R)\%25,$$

wherein $W$ represents the total number of times the first operation value has been inputted into the operation value processing step for executions, and the symbol ^ represents an exponential operator.

6. The random number generating method as claimed in claim 2, wherein the random number algorithm is:

$$\text{bit}[i]=1\&(C_1\oplus C_2\oplus\ldots\oplus C_n\oplus CP_1\oplus CP_2\oplus\ldots\oplus CP_n\oplus CPP_1\oplus CPP_2\oplus\ldots\oplus CPP_n)$$

wherein & represents an AND operator, ⊕ represents an XOR operator, and bit[i] represents the random number.

7. The random number generating method as claimed in claim 2, wherein the random number processing step comprises:
   a bit number determination step determining whether the total number of bits of the random number is the multiple of the operation length of the seed via the operation unit;
   a second operation value designation step designating the second operation value as the first operation value and performing the operation value setting step via the operation unit, upon negative determination of the bit number determination step;
   a third operation value designation step designating the third operation value as the first operation value upon positive determination of the bit number determination step; and
   a seed designation step setting the latest random number having a length equal to the operation length as the seed via the operation unit upon positive determination of the bit number determination step.

8. The random number generating method as claimed in claim 1, wherein the threshold value is set as half of a variance of the first 1K bytes of the data sequence.

9. The random number generating method as claimed in claim 1, wherein the predetermined value is 100.

* * * * *